United States Patent
Ji et al.

(10) Patent No.: US 10,737,661 B2
(45) Date of Patent: Aug. 11, 2020

(54) WIPER DRIVING APPARATUS AND METHOD FOR DRIVING SAME

(71) Applicant: LG INNOTEK CO., LTD., Seoul (KR)

(72) Inventors: Chil Young Ji, Seoul (KR); Yang Rae Kim, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 305 days.

(21) Appl. No.: 15/750,749

(22) PCT Filed: Jul. 28, 2016

(86) PCT No.: PCT/KR2016/008319
§ 371 (c)(1),
(2) Date: Feb. 6, 2018

(87) PCT Pub. No.: WO2017/023024
PCT Pub. Date: Feb. 9, 2017

(65) Prior Publication Data
US 2020/0086831 A1   Mar. 19, 2020

(30) Foreign Application Priority Data
Aug. 6, 2015   (KR) .................. 10-2015-0111285

(51) Int. Cl.
*B60S 1/08* (2006.01)
*G01N 27/04* (2006.01)

(52) U.S. Cl.
CPC .......... *B60S 1/0829* (2013.01); *G01N 27/048* (2013.01)

(58) Field of Classification Search
CPC .... G01N 27/048; G01N 27/223; G01N 27/22; G01R 27/26; G01R 27/2605; G01W 1/14;
(Continued)

(56) References Cited

U.S. PATENT DOCUMENTS

| 4,527,105 A * | 7/1985 | Shiraishi | B60S 1/0822 15/DIG. 15 |
|---|---|---|---|
| 4,613,802 A * | 9/1986 | Kraus | B60S 1/0818 250/338.1 |

(Continued)

FOREIGN PATENT DOCUMENTS

| DE | 40 00 164 A1 | 7/1991 |
|---|---|---|
| GB | 2 105 184 A | 3/1983 |

(Continued)

OTHER PUBLICATIONS

Supplementary European Search Report dated Jul. 16, 2018 in European Application No. 16833260.9.

(Continued)

*Primary Examiner* — Randy W Gibson
*Assistant Examiner* — Gedeon M Kidanu
(74) *Attorney, Agent, or Firm* — Saliwanchik, Lloyd & Eisenschenk

(57) ABSTRACT

A wiper driving apparatus according to embodiments comprises: a sensor unit including a carbon micro coil; a precipitation amount sensing unit for outputting an output value corresponding to the value of a difference between a first frequency and a preset second frequency according to a change in the impedance value of the sensor unit; and a control unit for determining whether there is precipitation and the amount of precipitation by using the output value output through the precipitation amount sensing unit, and determining wiper driving conditions according to the determined results, wherein the first frequency is changed to correspond to a change in the inductance value of the carbon micro coil according to whether there is precipitation and the amount of precipitation.

15 Claims, 10 Drawing Sheets

(58) Field of Classification Search
CPC ........ B60S 1/08; B60S 1/0818; B60S 1/0829; B60S 1/0825; B60S 1/0822; B60S 1/0859; B60S 1/0851; B60J 1/002; B60H 1/00785; H05B 3/145; Y10S 15/15; Y10S 318/02; Y10T 307/766; Y10T 307/779
See application file for complete search history.

(56) References Cited

U.S. PATENT DOCUMENTS 6,292,104 B1 * 9/2001 Wakabayashi ........ G01F 23/266
340/612
8,609,975 B2 12/2013 Veerasamy

FOREIGN PATENT DOCUMENTS

| | | |
|---|---|---|
| JP | 2007-252590 A | 10/2007 |
| JP | 2007-316053 A | 12/2007 |
| KR | 10-2001-0087105 A | 9/2001 |
| KR | 10-2009-0126754 A | 12/2009 |
| KR | 10-2010-0115089 A | 10/2010 |
| KR | 10-2011-0138101 A | 12/2011 |
| KR | 10-1182160 B1 | 9/2012 |
| KR | 10-2013-0058664 A | 6/2013 |

OTHER PUBLICATIONS

International Search Report in International Application No. PCT/KR2016/008319, filed Jul. 28, 2016.

* cited by examiner

WIPER DRIVING APPARATUS AND METHOD FOR DRIVING SAME

CROSS-REFERENCE TO RELATED APPLICATIONS

This application is the U.S. national stage application of International Patent Application No. PCT/KR2016/008319, filed Jul. 28, 2016, which claims priority to Korean Application No. 10-2015-0111285, filed Aug. 6, 2015, the disclosures of each of which are incorporated herein by reference in their entirety.

TECHNICAL FIELD

Embodiments relate to a wiper driving apparatus and, more particularly, a wiper driving apparatus capable of determining presence/absence of rain and the amount of rainfall using a carbon micro coil (CMC) and driving a wiper according to presence/absence of rain and the amount of rainfall.

BACKGROUND ART

In general, a wiper is installed on a windshield of a vehicle in order to solve visibility obstacle occurring due to rainwater in case of rain. Intermittent speed control of the wiper is performed step by step according to the amount of falling raindrops. However, since such a wiper speed control system performs control through only several steps, the wiper cannot be driven at a speed desired by a driver according to the amount of rainwater.

In order to solve such a problem, a circuit board, on which a light source and a sensor, which is a light receiving element, are mounted, is provided to be inclined with respect to the surface of the windshield to minimize influence of light reflected from the surface of the windshield, and only an optical signal reflected from raindrops is received to increase rain sensing efficiency. That is, since light directly reflected from the windshield escapes from a light receiving range of the light receiving element to minimize the amount of light reflected from the windshield and received by the light receiving element and only the amount of light reflected from raindrops is received by the light receiving element, the circuit board including the light source and the light receiving element are provided to be inclined with respect to the surface of the windshield at a predetermined angle such that only diffused reflected signals from raindrops are sensed.

However, even in a product in which a circuit board including a light source and a light receiving element is provided to be inclined with respect to a windshield of a vehicle, since light emitted from the light source may be directly absorbed to the light receiving element, rain sensing efficiency is incomplete and insufficient. That is, light emitted from the light source is spread at a predetermined angle range. Even when the light source and the light receiving element are provided to be inclined with respect to the surface of the windshield, since some light other than light escaping from the windshield is directly irradiated toward the light receiving element, raindrop sensing efficiency may be slightly reduced due to indirect light delivered from the light source to the light receiving element and thus rain sensing efficiency may be incomplete and insufficient.

Even when peripheral interference light such as light emitted from headlights of adjacent vehicles is minimized, some interference light may not be blocked. In addition, a light-sensing rain sensor is very sensitive and may be influenced by a small amount of unblocked peripheral light. Therefore, high rain sensing effects cannot be obtained. In addition, in order to implement a structure for minimizing influence of peripheral light, the structure may become slightly complicated. Therefore, productivity may not be efficient and product costs may be increased.

DISCLOSURE

Technical Problem

According to the embodiment of the present invention, provided are a wiper driving apparatus capable of sensing change in impedance of a carbon micro coil due to raindrops falling on a windshield of a vehicle and determining presence/absence of rain and the amount of rainfall, and a method of driving the same.

In addition, according to the embodiment, provided are a wiper driving apparatus capable of determining presence/absence of rain and the amount of rainfall using an element including a carbon micro coil and controlling driving of a wiper and a driving speed of the wiper, and a method of driving the same.

In addition, according to the embodiment, provided are a wiper driving apparatus capable of distinguishing between foreign materials and rainwater and driving a wiper at a speed corresponding to the amount of rainfall only when rainwater is sensed, and a method of driving the same.

In addition, according to the embodiment, provided are a wiper driving apparatus capable of driving a wiper according to the amount of rainfall only when a difference between a first frequency according to reaction properties of a carbon micro coil generated by rain and a second frequency according to a reference frequency is within a predetermined reaction range, and a method of driving the same.

The technical problems solved by the present invention are not limited to the above technical problems and other technical problems which are not described herein will become apparent to those skilled in the art from the following description.

Technical Solution

In accordance with one embodiment, a wiper driving apparatus includes a sensor unit including a carbon micro coil, a rainfall sensing unit for outputting an output value corresponding to a difference value between a first frequency according to change in an impedance value of the sensor unit and a predetermined second frequency, and a controller for determining presence/absence of rain and an amount of rainfall using the output value output from the rainfall sensing unit and determining a wiper driving condition according to the result of determination. The first frequency is changed in correspondence with change in inductance value of the carbon micro coil according to presence/absence of rain and the amount of rainfall.

The rainfall sensing unit may include a first frequency generator for outputting the first frequency having an oscillation frequency corresponding to change in impedance of the sensor unit, a second frequency generator for outputting the second frequency corresponding to a predetermined reference oscillation frequency, a difference frequency generator for outputting a difference value between the first frequency and the second frequency, and a filter for filtering the difference value output from the difference frequency generator within a predetermined filtering region.

The filtering region of the filter may be set based on a first threshold of change in inductance value of the carbon micro coil due to falling of rain.

The controller may distinguish a material for generating the difference value based on the first threshold and a second threshold of change in inductance value due to a material other than rain.

The filter may include any one of a low pass filter and a band pass filter according to the difference value between the first frequency and the second frequency generated according to the amount of rainfall.

The controller may determine the amount of rainfall according to the difference value between the first frequency and the second frequency filtered through the filter and determining a driving speed of a wiper according to the amount of rainfall.

The first frequency may have a frequency corresponding to change in inductance value of the carbon micro coil configuring the sensor unit and capacitance value of a capacitor connected to the carbon micro coil.

The sensor unit may include a substrate, a sensing electrode formed on a first surface of the substrate, a reaction layer formed on the first surface of the substrate while embedding an upper surface of the substrate and the sensing electrode and formed of the carbon micro coil, and a protective layer surrounding the vicinity of the substrate and the reaction layer.

The reaction layer may generate change in positive imaginary part of impedance due to force applied by falling of rain and change in negative imaginary part of impedance due to change in dielectric constant by an object present on a second surface.

A plurality of sensing electrodes may be formed, each of the plurality of sensing electrodes may include a first electrode part disposed in an edge region of the substrate, and a second electrode part extending from one end of the first electrode part in a longitudinal direction of the substrate, and an internal angle between the first electrode part and the second electrode part may be an obtuse angle.

In accordance with another embodiment, a wiper driving method includes outputting a first frequency having an oscillation frequency corresponding to change in impedance value of a sensor unit including a carbon micro coil, outputting a second frequency corresponding to a predetermined reference oscillation frequency, determining presence/absence of rain and an amount of rainfall based on a difference value between the first frequency and the second frequency, and determining a wiper driving condition according to presence/absence of rain and the amount of rainfall. The first frequency is changed in correspondence with change in inductance value of the carbon micro coil according to presence/absence of rain and the amount of rainfall.

The determining of the amount of rainfall may include filtering the difference value between the first frequency and the second frequency within a predetermined filtering region.

The filtering region may be set based on a first threshold of change in inductance value of the carbon micro coil according to falling of rain.

The wiper driving method may further include detecting a material for generating the difference value between the first threshold and a second threshold of change in inductance value due to a material other than rain.

The filtering comprises filtering the first difference value between the first frequency and the second frequency changed according to the amount of rainfall through any one of a low pass filter and a band pass filter.

The determining of the wiper driving condition may include determining the amount of rainfall according to the filtered difference value between the first frequency and the second frequency when the difference value is in a filtering region and determining a driving speed of the wiper according to the amount of rainfall.

The outputting of the first frequency may include outputting the first frequency having an oscillation frequency corresponding to change in inductance value of the carbon micro coil configuring the sensor unit and capacitance value of a capacitor connected to the carbon micro coil.

Advantageous Effect

According to embodiments, when rain falls, a wiper is immediately driven based on a driving condition according to the amount of rainfall, thereby improving convenience of a driver in case of rain.

According to embodiments, presence/absence of rain and the amount of rainfall are determined using a carbon micro coil, thereby providing a rain sensor having properties (reaction properties, precision, accuracy, power consumption, miniaturization, etc.) differentiated from an existing optical method.

In addition, according to embodiments, since an external environment does not influence a rain sensor, an additional correction sensor for correcting the properties of the rain sensor is not necessary, thereby reducing costs.

In addition, according to embodiments, since presence/absence of rain and the amount of rainfall can be determined even by small change in inductance of a carbon micro coil, a small amount of rainfall may be sensed. In addition, a reaction region for avoiding foreign materials is set, such that the wiper is inhibited from being driven by the foreign materials.

BEST MODE

Figure 1:
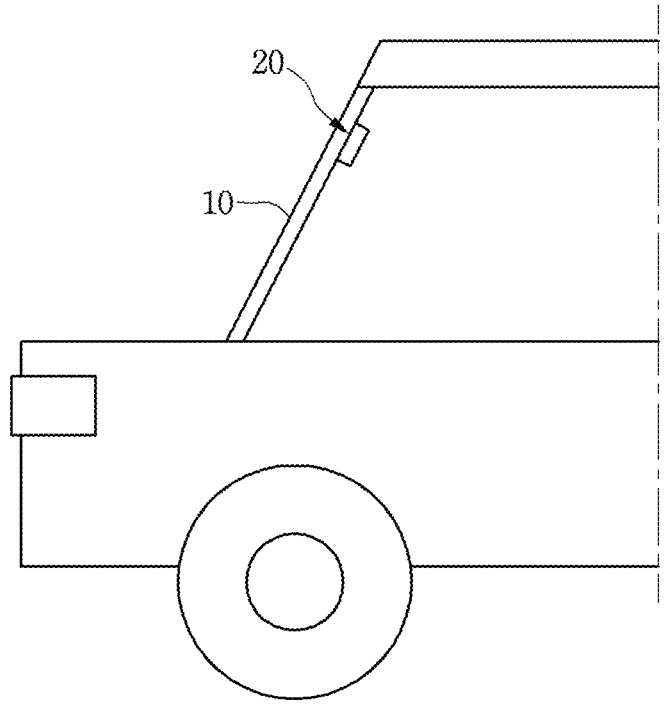
FIG. 1 is a side view showing a state in which a rain sensor is mounted on a windshield of a vehicle according to an embodiment of the present invention.

The advantages and features of the present invention and the way of attaining them will become apparent with reference to embodiments described below in detail in conjunction with the accompanying drawings. Embodiments, however, may be embodied in many different forms and should not be constructed as being limited to example embodiments set forth herein. Rather, these example embodiments are provided so that this disclosure will be through and complete and will fully convey the scope to those skilled in the art. The scope of the present invention should be defined by the claims. Wherever possible, the same reference numbers will be used throughout the drawings to refer to the same or like parts.

In describing the present invention, if it is determined that the detailed description of a related known function or construction renders the scope of the present invention unnecessarily ambiguous, the detailed description thereof will be omitted. Meaning of terminology used herein should be determined in consideration of functionality of the present invention, and it may be variable depending on user's or operator's intention, or customs in the art. Therefore, corresponding meaning should be determined with reference to the entire pages of the specification.

The combination of the blocks of the accompanying drawings and the steps of flowcharts may be implemented by computer program instructions. Since these computer program instructions may be installed in general purpose computers, special purpose computers, or processors of other programmable data processing apparatuses, the instructions performed through the computers or processors of other programmable data processing apparatuses generate means for performing functions described in the blocks of the drawings or the steps of the flowcharts. Since these computer program instructions may be stored in a computer-available or computer-readable memory supporting computers or other programmable data processing apparatuses in order to implement functions in a particular manner, these computer program instructions stored in a computer-available or computer-readable memory supporting computers or other programmable data processing apparatuses may produce products including instruction means for performing the functions described in the blocks of the drawings or the steps of the flowchart. Since computer program instructions may be installed in computers or other programmable data processing apparatuses, a series of operation steps is performed on the computers or other programmable data processing apparatuses to generate processes performed by the computers such that the instructions performed by the computers or other programmable data processing apparatuses may provide steps for performing the functions described in the blocks of the drawings and the steps of the flowcharts.

Also, each block or each step may represent a module, segment, or portion of code, which includes one or more executable instructions for implementing the specified logical function(s). In addition, in some alternative embodiments, it should be noted that the functions described in the blocks or steps may be performed out of order. For example, the functions of consecutively shown two blocks or steps may be executed substantially at the same time or may be executed in inverse order.

Figure 2:
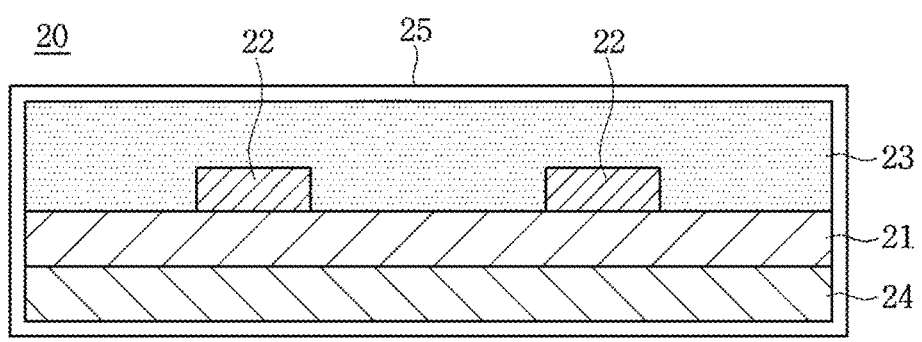
FIG. 2 is a cross-sectional view showing a detailed structure of the rain sensor shown in FIG. 1.
Figure 3A:
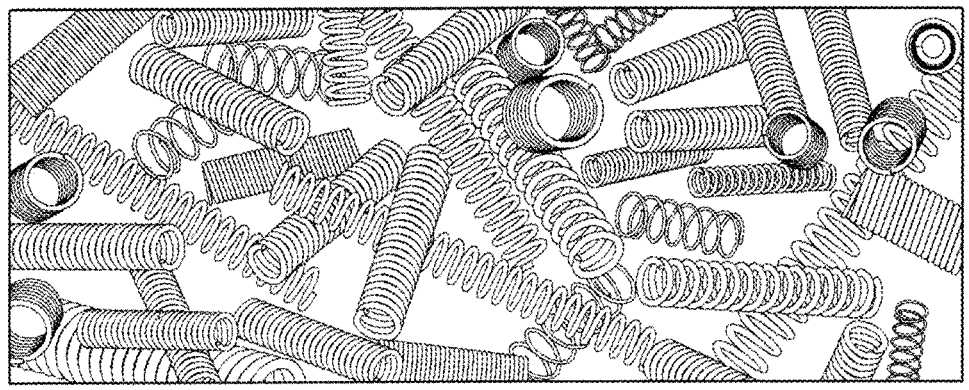
FIGS. 3(*a*) and 3(*b*) are diagrams showing a reaction layer shown in FIG. 2.
Figure 3B:
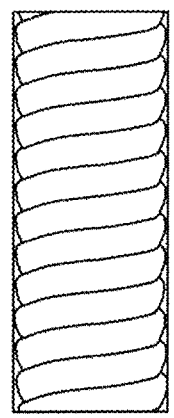
Figure 4:
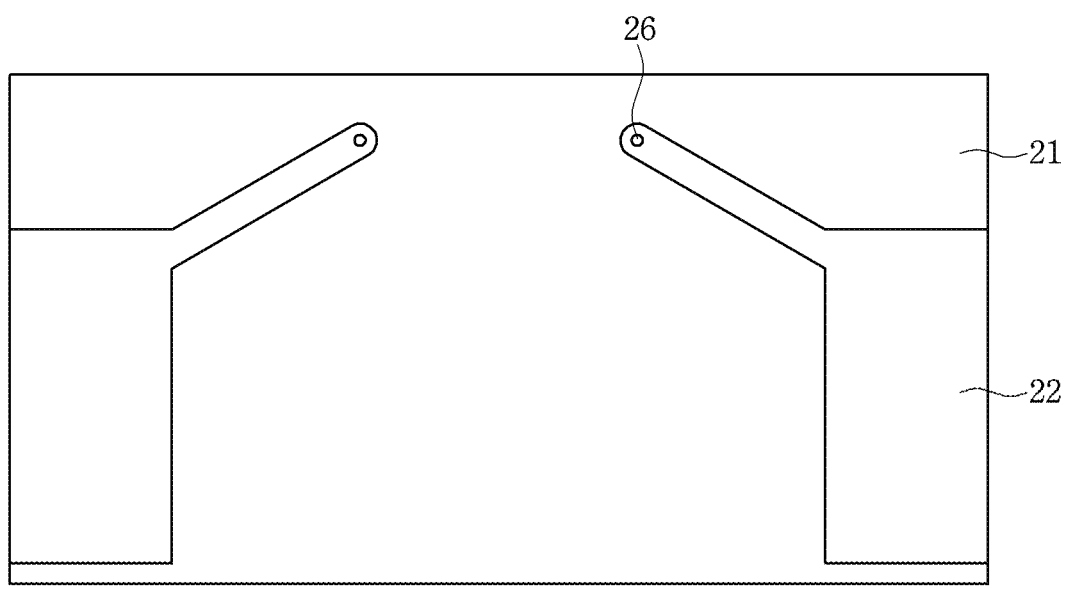
FIG. 4 is a plan view of a sensing electrode shown in FIG. 2.

FIG. 1 is a side view showing a state in which a rain sensor is mounted on a windshield of a vehicle according to an embodiment of the present invention, FIG. 2 is a cross-sectional view showing a detailed structure of the rain sensor shown in FIG. 1, FIGS. 3(*a*) and 3(*b*) are diagrams showing a reaction layer shown in FIG. 2, and FIG. 4 is a plan view of a sensing electrode shown in FIG. 2.

Referring to FIGS. 1 to 4, a rain sensor 20 is mounted on a windshield 10 of a vehicle.

The rain sensor 20 is provided to face the windshield 10 of the vehicle and senses presence/absence of raindrops falling on the windshield 10 or change in impedance according to the amount of raindrops.

The rain sensor 20 forms a sensing region at a predetermined position of the windshield 10 of the vehicle and senses information on the state of raindrops generated in the sensing area.

Referring to FIG. 2, the rain sensor 20 includes a substrate 21, sensing electrodes 22, a reaction layer 23, a driving part 24 and a protective layer 25.

The rain sensor 20 senses change in impedance in a predetermined region located inside the windshield 10 of the vehicle according to presence/absence of raindrops falling on the windshield 10 and provides information on driving of a wiper.

The substrate 21 is a base substrate, on which the sensing electrodes 22, the reaction layer 23 and the driving part 24 are mounted.

The sensing electrode 22 is formed on the substrate 21. The sensing electrodes 22 are embedded by the reaction layer 23 and are formed on an upper surface of the substrate 21.

A plurality of sensing electrodes 22 is formed to sense impedance changed according to reaction of the reaction layer 23 by a material formed on a surface of the reaction layer 23.

The sensing electrodes 22 may include a first sensing electrode having a positive polarity and a second sensing electrode having a negative polarity.

The reaction layer 23 is formed on the substrate 21. The reaction layer is formed to embed an upper surface of the substrate 21 and the sensing electrodes 22.

Preferably, the reaction layer 23 has a predetermined thickness and is formed on the substrate 21, on which the sensing electrodes 22 are formed.

The reaction layer 23 is formed of a conductive material and has properties in which impedance is changed according to force generated by an external material or change in permittivity.

Preferably, the reaction layer 23 is a carbon micro coil (CMC) having a spring shape. That is, the reaction layer 23 is formed by depositing hydrocarbon, that is, at least one of acetylene, methane, propane and benzene, on the substrate 21 using a chemical vapor deposition (CVD) process.

Alternatively, the reaction layer 23 may be manufactured using metal catalyst based on nickel or nickel-iron.

The carbon micro coil may not have a linear shape but may have a rolled shape like a pig tail, as shown in FIGS. 3(*a*) and 3(*b*) and is amorphous carbon fiber having a unique structure, which cannot be implemented by a textile material. The carbon micro coil may extend to a length corresponding to 10 times or more of an original length of a coil, and has super elasticity.

FIG. 3(*a*) shows a carbon micro coil formed in the reaction layer 23 and FIG. 3(*b*) is a detailed diagram of the carbon micro coil.

The morphology of the reaction layer 23 has a 3D-helical/spiral structure and a crystal structure is amorphous.

In other words, the reaction layer 230 is formed by growing the carbon fiber in a coil shape. The reaction layer 23 has a cross-sectional structure obtained by growing a carbon fiber in a coil shape.

That is, the impedance of the reaction layer 23 is changed by force applied when a specific material contacts the surface of the windshield 10, to which the rain sensor 20 is attached, or permittivity of the specific material.

The sensing electrodes 22 senses change in impedance of the reaction layer 23 and delivers a sensing signal according to change in impedance to the driving part 24.

The driving part 24 is formed on a lower surface of the substrate 21 to sense presence/absence of rain or the amount of rainfall according to the sensing signal delivered through the sensing electrodes 22 and to generate a control signal for controlling operation of the wiper according to presence/absence of rain and the amount of rainfall.

That is, generally, REAL TERM of impedance is resistance, POSITIVE IMAGINARY TERM is inductance, and NEGATIVE IMAGINARY TERM is capacitance, and impedance is a sum of resistance, inductance and capacitance.

Accordingly, like a general resistor, inductor and capacitor, the rain sensor 20 requires a pair of sensing electrodes 22 in order to sense change in impedance generated in the reaction layer 23. The sensing electrodes 22 serve to connect the reaction layer 23 and the driving part 24 while optimizing the sensing properties of the reaction layer 23.

Here, when specific force is applied to the surface of the windshield 10 or a material having specific permittivity contacts the surface of the windshield, capacitance of the reaction layer 23 increases and thus a resistance value and an inductance value decrease.

At this time, the sensed impedance value is a sum of the resistance value, the inductance value and the capacitance. Thus, the impedance value is linearly decreased according to force applied to the surface or permittivity.

At this time, the sensing electrode 22 has a structure shown in FIG. 4 and is formed on the substrate 21.

The sensing electrode 22 includes a first electrode part formed in an edge region of the substrate 21 and a second electrode part extending from one end of the first electrode part to the center region of the substrate and having a predetermined tilt angle with respect to one end of the first electrode part.

That is, the change state of impedance generated in the reaction layer 23 is changed according to the shape of the sensing electrodes 22.

Accordingly, in the present invention, in order to optimally control the change state of impedance of the reaction layer 23, the sensing electrodes 22 each having the first electrode part and the second electrode part are formed on the substrate 21.

Meanwhile, a via 26 is formed in a lower part of one end of the second electrode part.

The via 26 is formed by embedding a metal material in a through-hole penetrating through the upper and lower surfaces of the substrate 21.

One end of the via 26 penetrates through the substrate 21 to be connected to the sensing electrode and the other end of the via 26 is connected to the driving part 24 attached to the lower surface of the substrate 21.

Meanwhile, the driving part 24 includes an analog front end (AFE) and is connected to the sensing electrode 22 through the via 26.

At this time, the AFE performs a differential amplification function and the change state of impedance according to rain is changed according to positive differential amplification or negative differential amplification.

Accordingly, the driving part 24 senses the change state of the impedance value based on a reference value according to the differential amplification state and drives the wiper to remove raindrops when the change state exceeds a threshold.

Hereinafter, a step of driving the wiper will be described in greater detail.

That is, when raindrops fall, the raindrops apply predetermined force to the windshield 10 or change permittivity.

In addition, impedance change occurs in the reaction layer 23 according to the applied force or change in permittivity.

At this time, change in impedance may correspond to presence/absence of rain and the amount of rainfall. That is, force applied to the reaction layer 23 or permittivity increases in proportion to the amount of rainfall and change in impedance decreases in inverse proportion to increase in permittivity or force.

When rain falls, the impedance of the reaction layer 23 is changed and the amplitude of the internal clock of the driving part 24 is changed according to change in impedance.

A differential signal according to differential amplification of the AFE of the driving unit 24 is output according to change in amplitude of the internal clock.

Thereafter, when the differential signal is output, the output differential signal is converted into a digital signal and is delivered to a main controller (which will be described below) of the vehicle.

The main controller (not shown) determines presence/absence of rain and the amount of rainfall based on change in impedance according to the delivered digital signal, and drives the wiper for removing raindrops when rain falls and the amount of rainfall exceeds the threshold.

Figure 5:
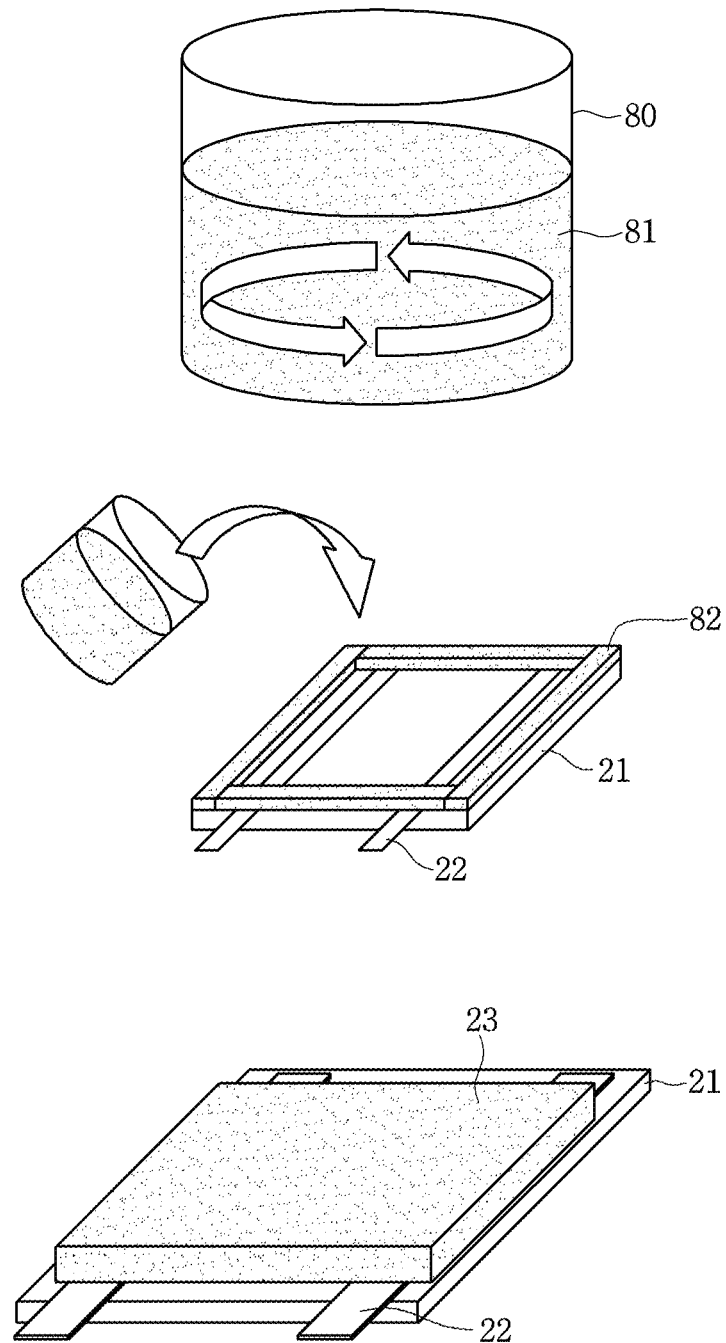
FIG. 5 is a diagram illustrating a method of manufacturing the rain sensor 20 shown in FIG. 2.

FIG. 5 is a diagram illustrating a method of manufacturing the rain sensor 20 shown in FIG. 2.

Referring to FIG. 5, first, liquid 81 used to form the reaction layer 23 is manufactured in a plating bath 80.

The liquid 81 may be formed of a carbon micro coil. At this time, the liquid 81 may include only a carbon micro coil. Alternatively, the liquid may further include resin and a dispersing agent.

In a first step, a carbon micro coil material and resin are put and mixed in the plating bath 80 and the dispersing agent is further added and dispersed. The dispersing agent is used to uniformly disperse the liquid on the substrate 21.

Next, the substrate 21 is prepared and the sensing electrodes 22 are formed on the prepared substrate 21.

The plurality of sensing electrodes 22 is formed and has a flat structure shown in FIG. 4.

Next, a frame 82 is formed in an edge region of the substrate 21. The frame 82 is formed on the substrate 21 while covering the edge region of the substrate 21 and exposing the center region of the substrate 21.

Next, the manufactured liquid 81 is put into the frame of the substrate 21.

In addition, the reaction layer 23 is formed based on the put liquid 81 through a curing process.

At this time, the curing process may be performed at a temperature of 120° C. for 30 minutes.

Hereinafter, the driving principle of the rain sensor 20 will be described in greater detail.

The sensing electrodes 22 are embedded in the reaction layer 23 formed of the carbon micro coil. The sensing electrodes 22 are connected to the driving part 24 mounted on the lower surface of the substrate 21 through the via 26.

At this time, the reaction layer 23 may determine presence/absence of rain and the amount of rainfall and the measurement sensitivity thereof is changed according to the shape of the sensing electrodes 22. In the embodiment, the sensing electrodes 22 having the flat structure are formed.

Accordingly, in the embodiment, optimization of various elements such as composition by controlling the content of the carbon micro coil, the optimized electrode shape or the position where the driving part 24 is mounted is important.

In addition, as described above, impedance includes a real part and an imaginary part (reactance) and the imaginary part includes a positive imaginary part (inductive) and a negative imaginary part (capacitive). At this time, the rain sensor 20 including the carbon micro coil performs measurement using two characteristic changes of the positive imaginary part (inductive) and the negative imaginary part (capacitive).

That is, when rain falls, force applied to the windshield 10 of the vehicle is changed according to the amount of rainfall and the amount of water (raindrops) present on the windshield 10 is also changed.

At this time, the carbon micro coil (CMC) is a group of micro coils and is a dielectric having a dielectric constant.

At this time, the force is measured through change in inductive component, that is, characteristic change of the carbon micro coil, and the amount of water present on the windshield 10 is measured by capacitive change by change in dielectric constant.

That is, each of the layers configuring the rain sensor 20 functions as a dielectric having a specific dielectric constant. If rain falls, water, that is, a dielectric, is newly generated from the viewpoint of the electrode and thus capacitive change occurs.

At this time, a real part may be adjusted according to the area of the reaction layer 23. When rain falls, as described above, the impedance value is changed by change in inductive and capacitive values.

Accordingly, in the embodiment, change in impedance value according to change in inductive and capacitive values of the rain sensor 20 is sensed to determine presence/absence of rain and the amount of rainfall.

Meanwhile, an adhesion member (not shown) such as silicon is formed on the inner side of the windshield 10 and the rain sensor 20 is mounted in a specific internal region of the windshield 10 by the adhesion member.

At this time, the rain sensor 20 senses change in impedance in consideration of the dielectric constant of the adhesion member.

Figure 6:
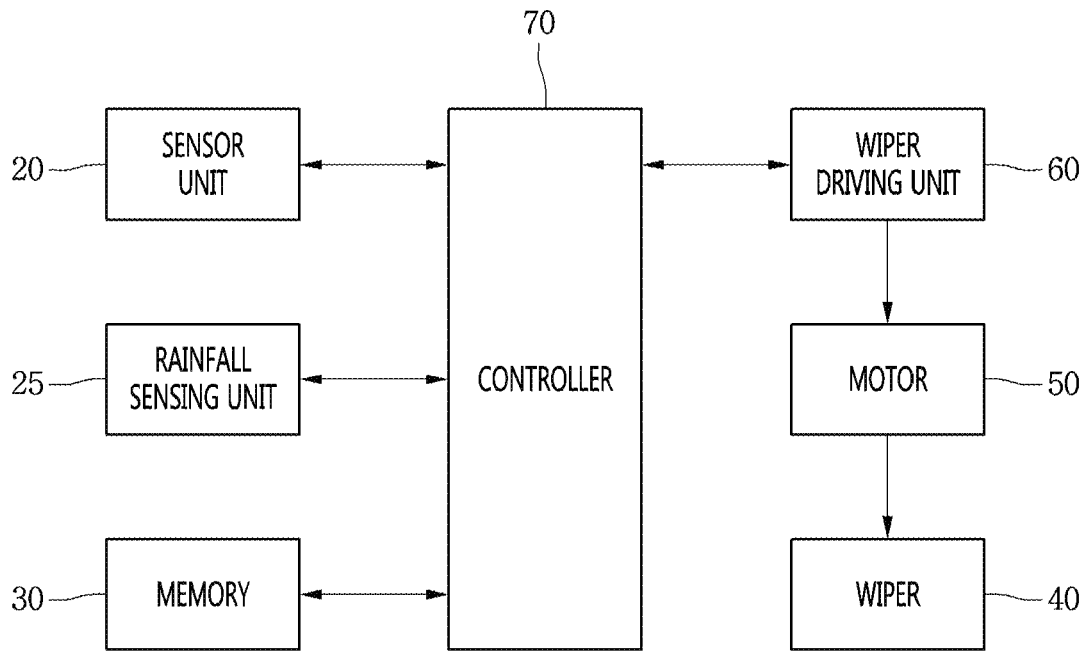
FIG. 6 is a diagram showing a wiper driving apparatus according to an embodiment.

FIG. 6 is a diagram showing a wiper driving apparatus according to an embodiment.

Referring to FIG. 6, the wiper driving apparatus includes a sensor unit 20, a rainfall sensing unit 25, a memory 30, a wiper 40, a motor 50, a wiper driving unit 60 and a controller 70.

The sensor unit 20 means the rain sensor and senses change in impedance occurring depending on presence/absence of rain.

The sensor unit 20 has the structure shown in FIG. 2.

In particular, the sensor unit 20 may have a circuit structure in which the carbon micro coil and a capacitor are connected in parallel.

The rainfall sensing unit 25 is connected to the sensor unit 20 to generate an oscillation frequency according to change in impedance of the sensor unit 20 occurring depending on presence/absence of rain and rainfall and to determine presence/absence of rain and the amount of rainfall according to a difference between the oscillation frequency and the reference frequency.

At this time, the rainfall sensing unit 25 senses whether the difference frequency between the oscillation frequency and the reference frequency is in a predetermined filtering region and outputs a digital value corresponding to the difference frequency only when the difference frequency is in the predetermined filtering region.

The detailed configuration and operation of the rainfall sensing unit 25 will be described below in greater detail.

Information for controlling various components of the vehicle is stored in the memory 30.

In particular, wiper driving condition information for driving the wiper in correspondence with the digital value according to the difference frequency output through the rainfall sensing unit 25 is stored in the memory 30.

The driving condition information may include whether the wiper is driven or not and driving speed information of the wiper.

At this time, the driving condition information may be divided according to the type of the filter included in the rainfall sensing unit 25.

That is, any one of a low pass filter (LPF) and a band pass filter (BPF) may be included in the rainfall sensing unit 25 according to the properties of the sensor unit 20.

The LPF and the BPF have different filtering frequency ranges.

In the embodiment, the driving condition information of the wiper corresponding to the output value according to the type of the filter included in the rainfall sensing unit 25 is stored in the memory 30.

The wiper 40 is mounted outside the windshield 10 of the vehicle to remove moisture such as raindrops present on the windshield 10.

The motor 50 drives the wiper 40 according to the predetermined condition.

The wiper driving unit 60 provides condition information for driving the wiper 40 to the motor 50.

The condition information may be information on power to be supplied to the wiper 40 through the motor 50.

The controller 70 receives an output value output through the rainfall sensing unit 25 and sets the driving condition for driving the wiper 40 based on the received output value.

Hereinafter, the configuration and operation of the rainfall sensing unit 25 will be described in greater detail.

Figure 7:
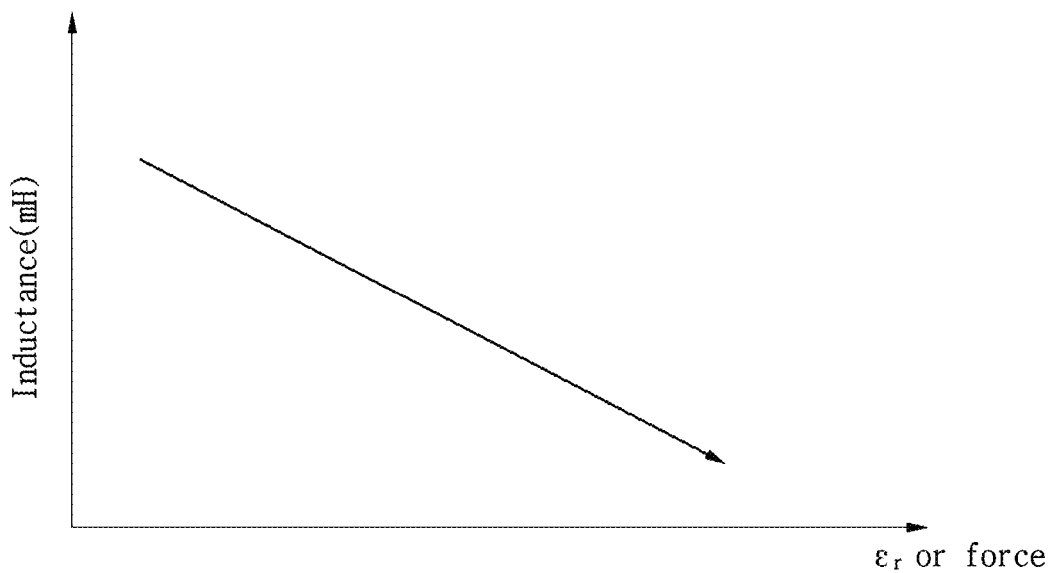
FIG. 7 is a diagram showing the properties of a carbon micro coil according to an embodiment of the present invention.

FIG. 7 is a diagram showing the properties of a carbon micro coil according to an embodiment of the present invention.

As shown in FIG. 7, the carbon micro coil usually has a first inductance value. When force is applied to the carbon micro coil or permittivity is changed, the inductance value decreases.

The inductance value has decrement changed according to the type of the material laid on the carbon micro coil.

That is, the inductance value has a relatively low decrement if rainwater contacts the carbon micro coil, has a decrement higher than that of the case where rainwater contacts the carbon micro coil if a portion of a human body contacts the carbon micro coil, and has a decrement higher than that of the case where rainwater or human body contacts the carbon micro coil if a metal material contacts the carbon micro coil.

Figure 8:
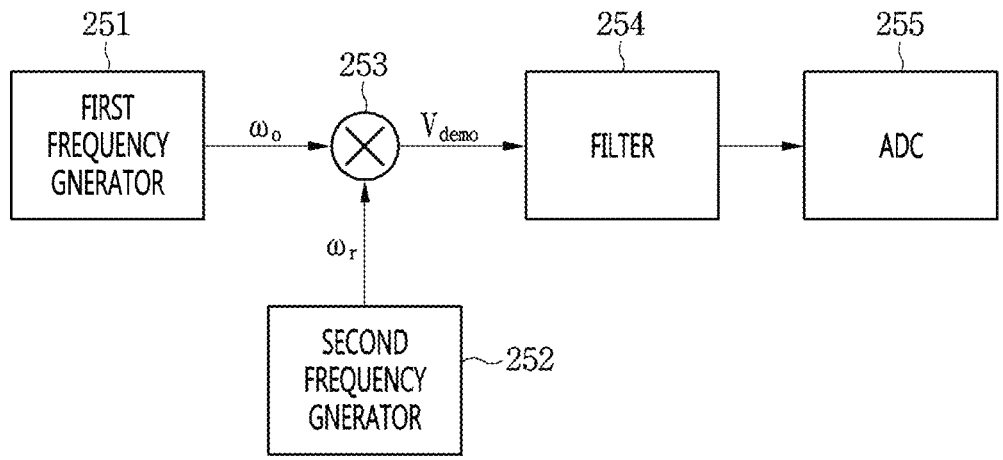
FIG. 8 is a diagram showing the configuration of a rainfall sensing unit 25 shown in FIG. 6.

FIG. 8 is a diagram showing the configuration of a rainfall sensing unit 25 shown in FIG. 6.

Referring to FIG. 8, the rainfall sensing unit 25 includes a first frequency generator 251, a second frequency generator 252, a difference frequency generator 253, a filter 245 and an analog-to-digital converter 255.

The first frequency generator 251 is connected to the sensor unit 20 to generate a first frequency according to change in impedance of the sensor unit 20.

The first frequency generator 251 may be composed of an LC oscillation circuit.

Preferably, the first frequency generator 251 is configured to generate an oscillation frequency changed according to change in inductance value of the carbon micro coil using the carbon micro coil and the capacitor configuring the sensor unit 20.

That is, the first frequency generator 251 oscillates the oscillation frequency by the sensor unit 20 using the carbon micro coil attached to the windshield.

In other words, the inductance value of the carbon micro coil configuring the sensor unit 20 and the capacitance value of the capacitor determine the oscillation frequency of the first frequency generator 251.

The second frequency generator is a reference oscillator and generates a second frequency corresponding to a reference oscillation frequency.

At this time, the first frequency generated by the first frequency generator 251 may be minutely changed. Therefore, in the first embodiment of the present invention, the filter 245 includes an LPF.

Hereinafter, assume that the filter 245 includes an LPF.

At this time, when rain does not fall in the sensor unit 20, the first frequency generated by the first frequency generator 251 and the second frequency generated by the second frequency generator 252 may be configured to have the same value.

In addition, when rain falls in the sensor unit 20, the difference between the first frequency and the second frequency increases according to the amount of rainfall and the amount of rainfall is determined based on the increased difference.

At this time, if the inductance of the carbon micro coil included in the sensor unit 20 is L and the capacitance of the capacitor is C, the first frequency $\omega_0$ generated by the first frequency generator 251 is expressed as shown in Equation 1.

$$\omega_o = \frac{1}{2\pi\sqrt{LC}} \qquad \text{Equation 1}$$

In addition, a first voltage value $V_0$ corresponding to the first frequency generated by the first frequency generator 251 is expressed as shown in Equation 2 below.

$$V_o = A_o \cos\omega_o I = A_o \frac{e^{j\omega_o t} + e^{-j\omega_o t}}{2} \qquad \text{Equation 2}$$

In addition, a second voltage value Vr corresponding to the second frequency generated by the second frequency generator 252 is expressed as shown in Equation 3 below.

$$V_r = A_r \cos\omega_r I = A_r \frac{e^{j\omega_r t} + e^{-j\omega_r t}}{2} \qquad \text{Equation 3}$$

The difference frequency generator 253 is connected to the first frequency generator 251 and the second frequency generator 252 to output a difference value corresponding to the difference between the first frequency generated by the first frequency generator 251 and the second frequency generated by the second frequency generator 252.

At this time, the difference value Vdmod generated by the difference frequency generator 253 is expressed as shown in Equation 4.

$$V_{dmod} = \frac{A_o A_c}{2}\left(1 + \frac{e^{j2\omega t} + e^{-j2\omega t}}{2}\right) \qquad \text{Equation 4}$$

where, the difference value has the value shown in Equation 4 above because, when rain does not fall in the sensor unit 20, the first frequency generated by the first frequency generator 251 and the second frequency generated by the second frequency generator 252 have the same value.

The filter 245 filters the output value generated by the difference frequency generator 253 to output the filtered output value.

At this time, a filtering region corresponding to a frequency range having a predetermined size is present in the filter 245 and the output value of the difference frequency generator 253 is filtered in the filtering region.

Here, the filtering region may be determined by the type of the filter 245 and the change properties of the carbon micro coil occurring when rain falls in the sensor unit 20.

The change properties of the carbon micro coil will be described below in greater detail.

Meanwhile, the type of the filter 245 may be determined by the structure of the carbon micro coil.

That is, the inductance value of the carbon micro coil is not changed in a large range but is minutely changed depending on presence/absence of rain and the amount of rainfall. When the difference between the first frequency generated by the first frequency generator 251 and the second frequency generated by the second frequency generator 252 is small according to the minutely changed value, the filter 245 may include an LPF.

When the difference between the first frequency generated by the first frequency generator 251 and the second frequency generated by the second frequency generator 252 is large according to change in inductance value of the carbon micro coil, the filter 245 may include a BPF.

In other words, the type of the filter 245 may be determined by a structure such as the area of the carbon micro coil configuring the sensor unit 20.

The analog-to-digital converter 255 converts the output value output from the filter 245 into a digital value and outputs the digital value.

Figure 9:
FIGS. 9 to 11 are diagrams showing change in a difference frequency value according to a first embodiment of the present invention.
Figure 10:
Figure 11:
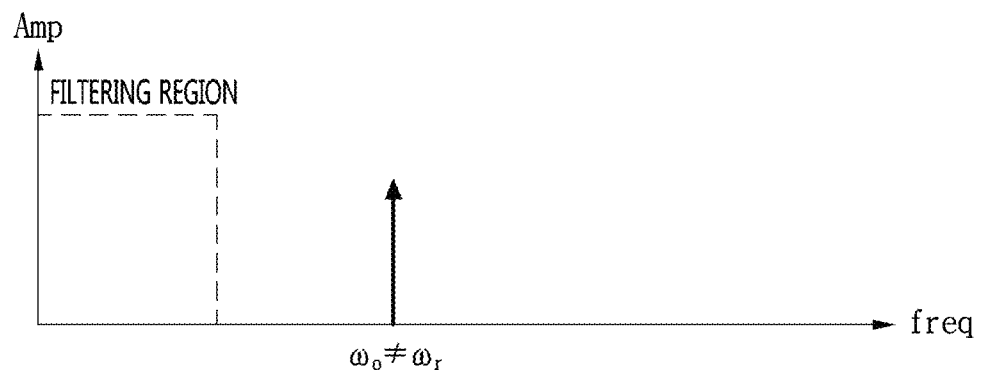

FIGS. 9 to 11 are diagrams showing change in a difference frequency value according to a first embodiment of the present invention.

Referring to FIG. 9, when a specific material does not contact the sensor unit 20 not to change permittivity, the first frequency generated by the first frequency generator 251 and the second frequency generated by the second frequency generator 252 may have the same frequency.

Accordingly, in a state in which rain does not fall, the output value filtered by the filter 245 according to the output value output from the difference frequency generator 253 is substantially a DC voltage.

Referring to FIG. 10, when a specific material contacts the sensor unit 20 to change permittivity and the contacted material is rainwater, the output value filtered by the filter 245 is subjected to frequency shift within the predetermined filtering region.

In other words, as rain falls, when the inductance value of the carbon micro coil of the sensor unit 20 is changed, the first frequency generated by the first frequency generator 251 is changed and thus the first frequency becomes different from the second frequency.

At this time, the difference frequency between the first frequency and the second frequency increases according to the intensity of rain (the amount of rainfall).

In the embodiment of the present invention, the amount of rainfall may be determined according to the difference frequency between the first frequency and the second frequency. In other words, in the embodiment of the present invention, presence/absence of rain and the amount of rainfall are determined according to the frequency domain change according to the signal output from the filter 245.

The difference between the first frequency and the second frequency may be generated by rainwater, moisture or a foreign material.

The foreign material may include a human body, paper, stone, metal, etc.

In the carbon micro coil, change in inductance value due to rainwater and change in inductance value due to the foreign material such as human body, paper, stone and metal are different.

In other words, a threshold point of change in inductance value of the carbon micro coil generated by rainwater and a threshold point of change in inductance value of the carbon micro coil generated by the foreign material such as human body, paper, stone and metal are different.

Accordingly, whether the difference between the first frequency and the second frequency is generated due to rainwater or a foreign material may be determined according to the threshold point of change in inductance value (change properties of the carbon micro coil).

In the embodiment, the filtering region of the filter 245 is determined according to the change properties of the carbon micro coil generated by the respective materials and the wiper may be selectively driven only when the difference between the first frequency and the second frequency is generated in the determined filtering region.

Referring to FIG. 11, if the difference between the first frequency and the second frequency is not generated by rainwater but is generated by the foreign material, the difference frequency may be outside the filtering region of the filter 245.

At this time, since the difference frequency is not included in the filtering region as shown in FIG. 11, the wiper is not driven.

Figure 12:
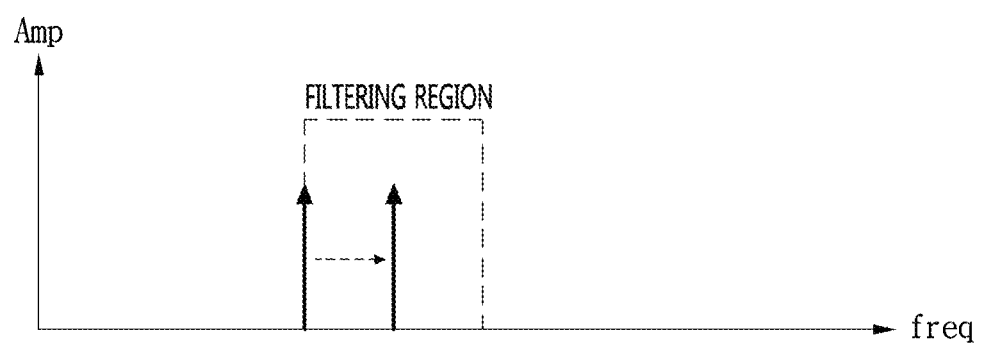
FIG. 12 is a diagram showing change in a difference frequency value according to a second embodiment of the present invention.

FIG. 12 is a diagram showing change in a difference frequency value according to a second embodiment of the present invention.

Referring to FIG. 12, in design of the sensor unit 20, if there is a difference between the first frequency and the second frequency when rain does not fall and if the first frequency largely increases/decreases when rain falls, the filter may include a BPF, At this time, the filtering region of the filter 245 may have a frequency range different from that of the LPF.

Presence/absence of rain and the amount of rainfall may be determined according to shift of the difference frequency generated according to change in difference frequency in the filtering region.

At this time, if the filter 245 is a BPF, the output value of the difference frequency generator 253 is expressed as shown in Equation 5 below.

$$V_{dmod} = \frac{A_o A_c}{2}\left(\frac{e^{j\Delta t} + e^{-j\Delta t}}{2} + \frac{e^{j2(\omega+\Delta)t} + e^{-j2(\omega+\Delta)t}}{2}\right) \quad \text{Equation 5}$$

Figure 13:
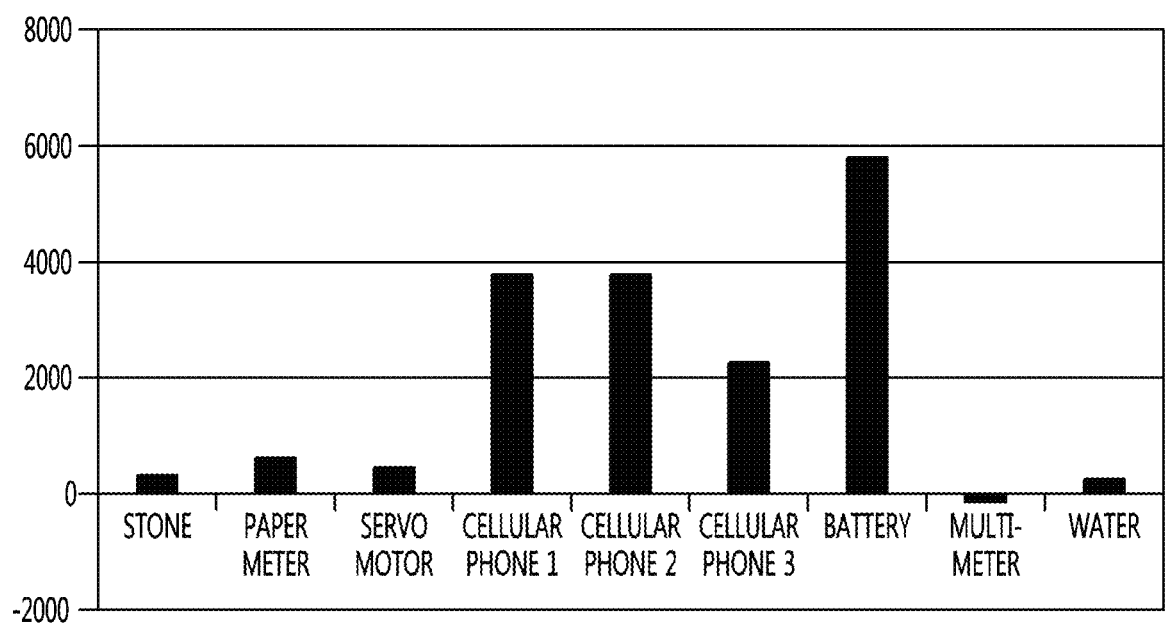
FIGS. 13 to 15 are graphs showing change properties of a carbon micro coil according to an embodiment of the present invention.
Figure 14:
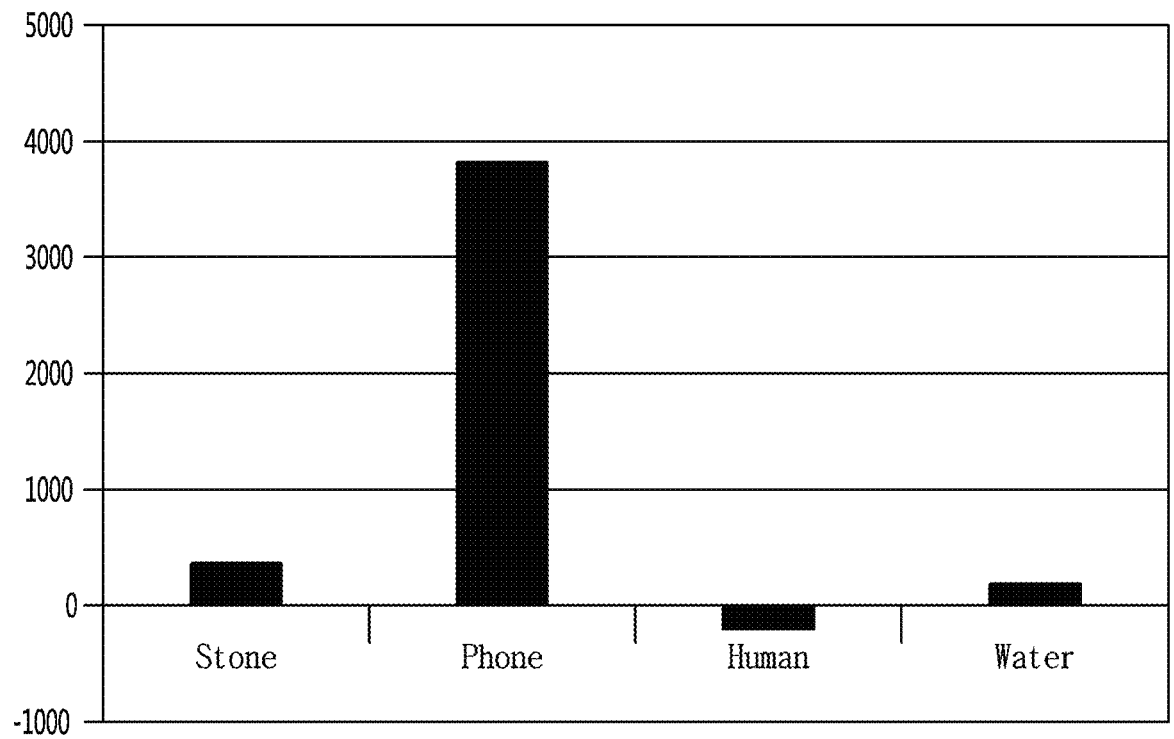
Figure 15:
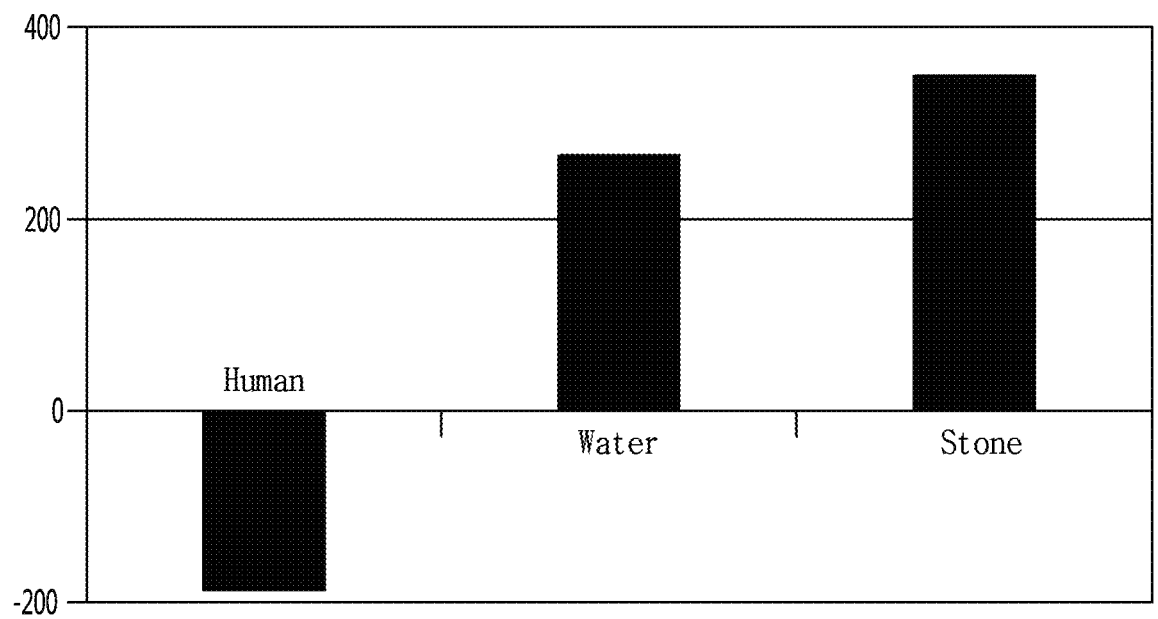

FIGS. 13 to 15 are graphs showing change properties of a carbon micro coil according to an embodiment of the present invention.

Referring to FIG. 13, the carbon micro coil has change properties which differ according to stone, paper, servo motor, cellular phone 1 (power off state), cellular phone 2 (power on state), cellular phone 3 (battery detachment state), battery, multi-meter and water.

In other words, the carbon micro coil generates an output value which differ according to the above-described materials.

The output value of the carbon micro coil may be differently changed according to a contact area and a contact direction even in the same stone. As the size of stone increases, the weight and contact area of stone increases and thus the output value increases.

Even when a non-magnetic material such as paper or a magnetic material such as a servo motor contacts the carbon micro coil, the output value is largely changed without influence of a magnetic field.

Referring to FIGS. 14 and 15, the output value of the carbon micro coil according to the present invention differ depending on whether a human body or rainwater contacts the carbon micro coil.

That is, the output value of the carbon micro coil has a minus value when a human body contacts the carbon micro coil and has a plus value when water such as rainwater contacts the carbon micro coil.

Accordingly, in the present invention, whether the difference between the first frequency generated by the first frequency generator 251 and the second frequency generated by the second frequency generator 252 is generated by contact of a human body or rainwater may be determined based on the properties of the carbon micro coil.

In the present invention, the reaction region of the rain sensor, that is, the filtering region of the filter 245, is determined based on the reaction properties of the carbon micro coil due to rainwater.

Accordingly, in the present invention, using the properties of the carbon micro coil, the sensor 20 may be driven only when rainwater is sensed and the wiper may not be driven when change is sensed by a foreign material such as a human body.

That is, generally, a driver automatically operates the rain sensor but a child may touch the rain sensor located at the front surface of the windshield out of curiosity. According to prior art, the wiper is driven according to sensing of the rain sensor, thereby hurting the child.

However, in the present invention, even when the difference between the first frequency and the second frequency is generated due to contact of the body of the child, the wiper is not driven, thereby ensuring safety.

As described above, in the present invention presence/absence of rain and the amount of rainfall are determined according to the change value of the oscillation frequency generated according to change in inductance of the carbon micro coil.

Meanwhile, in prior art using an existing optical method, since an optical signal recognized by a photodiode is changed according to external illumination even in the same amount of rainfall, an optical sensor for correcting this is further included. An optical proximity illumination sensor for inhibiting incorrect operation occurring when light having a specific level is irradiated to only the vicinity of the rain sensor in case of rain is further included. Therefore, means for verifying incorrect operation due to external environment change is necessarily required.

In prior art using an existing impedance method, separate circuit algorithm software needs to be developed such that the rain sensor does not react at a sensing level equal to or greater than a specific threshold point and specific sensing levels of specific materials (stone, person, metal, etc.) need to be stored in a database. When the vehicle is not driven, since the wiper is manually driven, means for inhibiting the wiper from erroneously operating when a specific foreign material approaches the rain sensor is necessary.

However, in the present invention, since an external environment does not influence on the properties of the rain sensor, an additional correction sensor for property correction is not necessary and thus costs can be reduced.

In addition, in the present invention, since presence/absence of rain and the amount of rainfall can be determined by minute change in inductance, a small amount of rainfall can be sensed and a foreign material on the windshield may be avoided using a circuit without a separate software algorithm for avoiding a foreign material.

Figure 16:
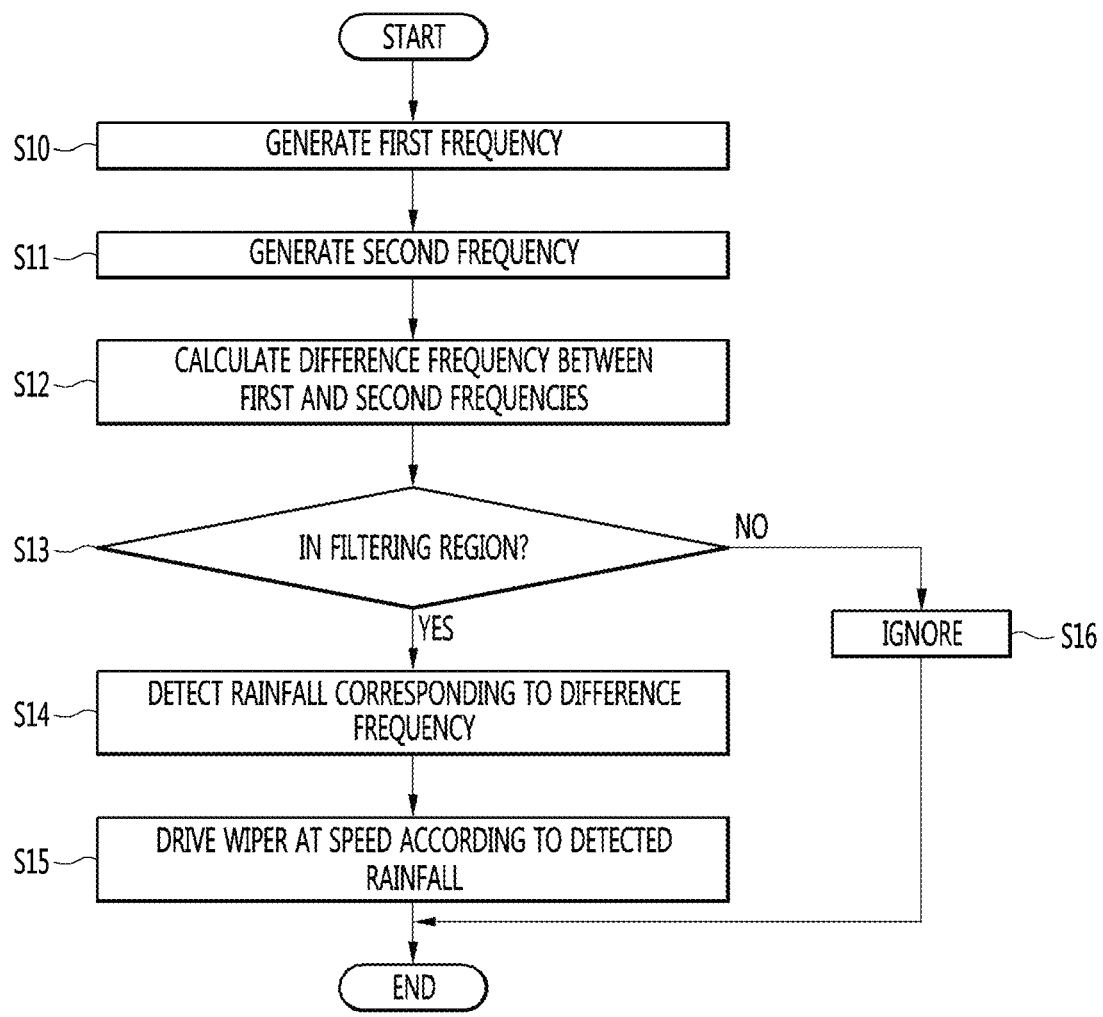
FIGS. 16 and 17 are flowcharts illustrating a method of driving a wiper driving apparatus according to an embodiment of the present invention step by step.
Figure 17:
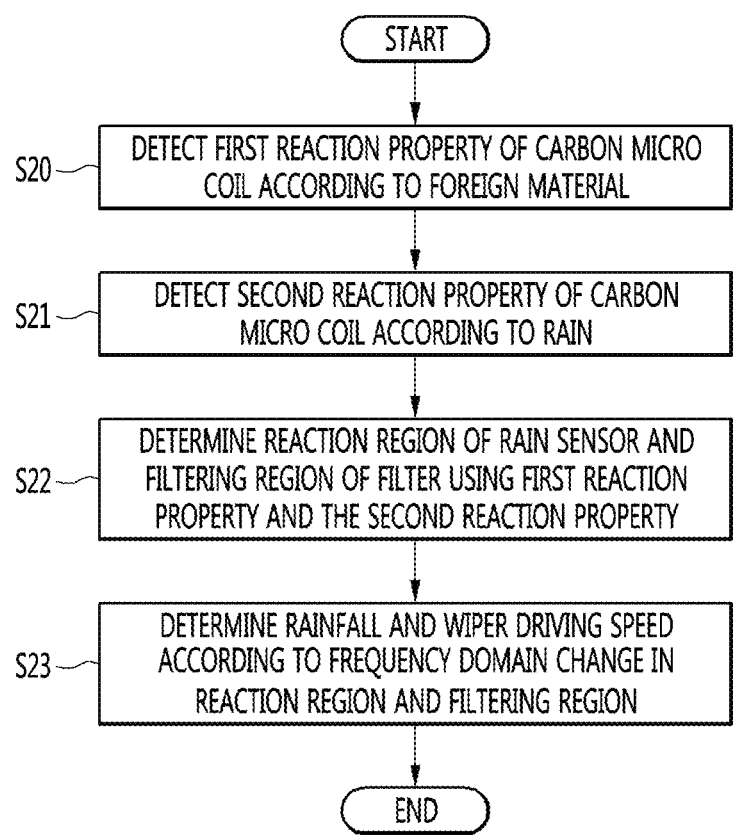

FIGS. 16 and 17 are flowcharts illustrating a method of driving a wiper driving apparatus according to an embodiment of the present invention step by step.

Referring to FIG. 16, first, the first frequency generator 251 generates the first frequency according to the inductance value of the carbon micro coil configuring the sensor unit 20 (step 10).

In addition, the second frequency generator 252 generates a second frequency corresponding to a predetermined reference oscillation frequency (step 11).

Subsequently, the difference frequency generator 253 receives the first frequency generated by the first frequency generator 251 and the second frequency generated by the second frequency generator 252 and outputs a difference frequency between the first frequency and the second frequency (step 12).

Then, the filter 245 filters the output difference frequency and determines whether the difference frequency is present in the predetermined filtering region (step 13).

When the difference frequency is present in the predetermined filtering region, the analog-to-digital converter 255 generates and outputs an output value corresponding to the difference frequency. The controller receives the output value and detects presence/absence of rain and the amount of rainfalls based on the received output value (step 14).

Subsequently, the controller determines the wiper driving condition based on the amount of rainfall and controls to drive the wiper according to the determined driving condition (step 15).

Meanwhile, when the received difference frequency is not present in the predetermined filtering region, the filter 245 does not output the output value corresponding to the received difference frequency and ignores the received difference frequency (step 16).

That is, when the difference between the first frequency and the second frequency is generated by a foreign material, the difference frequency is not present in the filtering region and the rain sensor does not react thereto.

According to the embodiment, when rain falls, the wiper is immediately driven according to the driving condition based on the amount of rainfall, thereby improving convenience of the driver in case of rain.

According to embodiments, presence/absence of rain and the amount of rainfall are determined using a carbon micro coil, thereby providing a rain sensor having properties (reaction properties, precision, accuracy, power consumption, miniaturization, etc.) differentiated from an existing optical method.

In addition, according to embodiments, since an external environment does not influence a rain sensor, an additional correction sensor for correcting the properties of the rain sensor is not necessary, thereby reducing costs.

In addition, according to embodiments, since presence/absence of rain and the amount of rainfall can be determined even by small change in inductance of a carbon micro coil, a small amount of rainfall may be sensed. In addition, a reaction area for avoiding foreign materials is set, such that the wiper is inhibited from being driven by the foreign materials.

Meanwhile, referring to FIG. 17, preferentially, in the present invention, the sensor unit 20 is designed and the filter is designed.

To this end, with respect to the carbon micro coil configuring the sensor unit 20, a first reaction property for change in inductance value due to a foreign material is detected (step 20).

When the first reaction property is detected, with respect to the carbon micro coil, a second reaction property for change in inductance value due to rain and the amount of rainfall is detected (step 21).

Subsequently, when the first reaction property and the second reaction property are detected, the reaction region of the rain sensor and the filtering region of the filter are determined using the detected first and second reaction properties (step 22).

In addition, when the reaction region of the line sensor and the filtering region of the filter are determined, the amount of rainfall according to frequency domain change in the filtering region and the wiper driving condition are determined based on change in inductance value generated according to the amount of rainfall and are stored (step 23).

The features, structures, effects described in the above-described embodiments are included in at least one embodiment and is not necessarily limited to one embodiment. Further, the features, structures, effects described in each embodiment may be combined or modified in other embodiments. Accordingly, such combinations or modifications will be interpreted as being included in the range of the embodiment.

Although the invention has been described with reference to the exemplary embodiments, the present invention is not limited thereto and those skilled in the art will appreciate that various modifications and variations can be made in the present invention without departing from the spirit or scope of the invention. For example, those skilled in the art may modify the components of the embodiments. Differences related to such modifications and applications are interpreted as being within the scope of the present invention described in the appended claims.

The invention claimed is:
1. A wiper driving apparatus comprising:
a sensor unit including a carbon micro coil;
a rainfall sensing unit for outputting an output value corresponding to a difference value between a first frequency according to change in an impedance value of the sensor unit and a predetermined second frequency; and a controller for determining presence/absence of rain and an amount of rainfall using the output value output from the rainfall sensing unit and determining a wiper driving condition according to the result of the determination, wherein the rainfall sensing unit comprises:
a first frequency generator for outputting the first frequency having an oscillation frequency corresponding to change in impedance of the sensor unit;
a second frequency generator for outputting the second frequency corresponding to a predetermined reference oscillation frequency;
a difference frequency generator for outputting a difference value between the first frequency and the second frequency; and
a filter for filtering the difference value output from the difference frequency generator within a predetermined filtering region, and wherein the controller is configured to:
determine whether the difference value is generated due to rainwater or a foreign material according to a threshold point of change in inductance value; and
determine the wiper driving condition of a wiper according to the difference value when the difference value is generated by rainwater.

2. The wiper driving apparatus according to claim 1, wherein the controller determines the amount of rainfall according to the difference value between the first frequency and the second frequency filtered through the filter and determining a wiper driving speed according to the amount of rainfall.

3. The wiper driving apparatus according to claim 1, wherein the first frequency has a frequency corresponding to change in inductance value of the carbon micro coil configuring the sensor unit and capacitance value of a capacitor connected to the carbon micro coil.

4. The wiper driving apparatus according to claim 3, wherein a plurality of sensing electrodes is formed,
wherein each of the plurality of sensing electrodes comprises:
a first electrode part disposed in an edge region of the substrate; and
a second electrode part extending from one end of the first electrode part in a longitudinal direction of the substrate, and
wherein an internal angle between the first electrode part and the second electrode part is an obtuse angle.

5. The wiper driving apparatus according to claim 1, wherein the sensor unit comprises:
a substrate;
a sensing electrode formed on a first surface of the substrate;
a reaction layer formed on the first surface of the substrate while embedding an upper surface of the substrate and the sensing electrode and formed of the carbon micro coil; and
a protective layer surrounding the vicinity of the substrate and the reaction layer.

6. The wiper driving apparatus according to claim 5, wherein the reaction layer generates change in positive imaginary part of impedance due to force applied by falling of rain and change in negative imaginary part of impedance due to change in dielectric constant by an object present on a second surface.

7. The wiper driving apparatus according to claim 1, wherein the filtering region of the filter is set based on a first threshold of change in inductance value of the carbon micro coil due to falling of rain.

8. The wiper driving apparatus according to claim 7, wherein the controller distinguishes the foreign material for generating the difference value based on the first threshold and a second threshold of change in inductance value due to the foreign material other than rain.

9. The wiper driving apparatus according to claim 7, wherein the filter comprises any one of a low pass filter and a band pass filter according to the difference value between the first frequency and the second frequency generated according to the amount of rainfall.

10. A wiper driving method comprising:
outputting a first frequency having an oscillation frequency corresponding to change in impedance value of a sensor unit including a carbon micro coil;
outputting a second frequency corresponding to a predetermined reference oscillation frequency;
determining presence/absence of rain and an amount of rainfall based on a difference value between the first frequency and the second frequency; and
determining a wiper driving condition according to presence/absence of rain and the amount of rainfall,
wherein the first frequency is changed in correspondence with change in inductance value of the carbon micro coil according to presence/absence of rain and the amount of rainfall,
wherein the determining of the amount of rainfall comprises:
filtering the difference value between the first frequency and the second frequency, within a predetermined filtering region;
determining whether the difference value is generated due to rainwater or a foreign material according to a threshold point of change in inductance value; and
determining the wiper driving condition according to the difference value when the difference value is generated by rainwater.

11. The wiper driving method according to claim 10, wherein the determining of the wiper driving condition comprises:
determining the amount of rainfall according to the filtered difference value between the first frequency and the second frequency when the difference value is in the predetermined filtering region; and
determining a wiper driving speed according to the amount of rainfall.

12. The wiper driving method according to claim 10, wherein the outputting of the first frequency comprises outputting the first frequency having an oscillation frequency corresponding to change in inductance value of the carbon micro coil configuring the sensor unit and capacitance value of a capacitor connected to the carbon micro coil.

13. The wiper driving method according to claim 10, wherein the filtering region is set based on a first threshold of change in inductance value of the carbon micro coil according to falling of rain.

14. The wiper driving method according to claim 13, comprising detecting the foreign material for generating the difference value between the first threshold and a second threshold of change in inductance value due to the foreign material other than rain.

15. The wiper driving method according to claim 13, wherein the filtering comprises filtering the first difference value between the first frequency and the second frequency changed according to the amount of rainfall through any one of a low pass filter and a band pass filter.

* * * * *